UNITED STATES PATENT OFFICE.

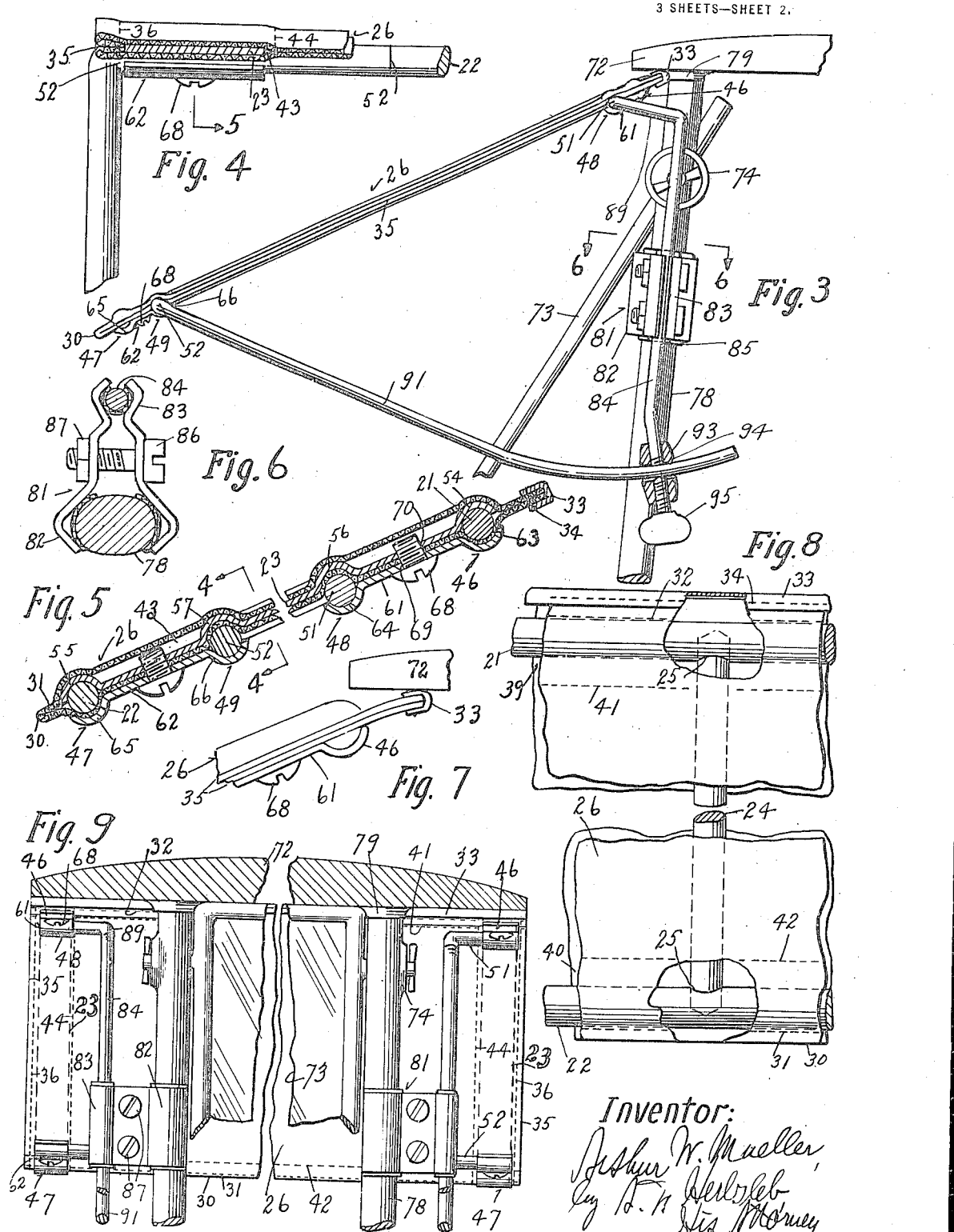

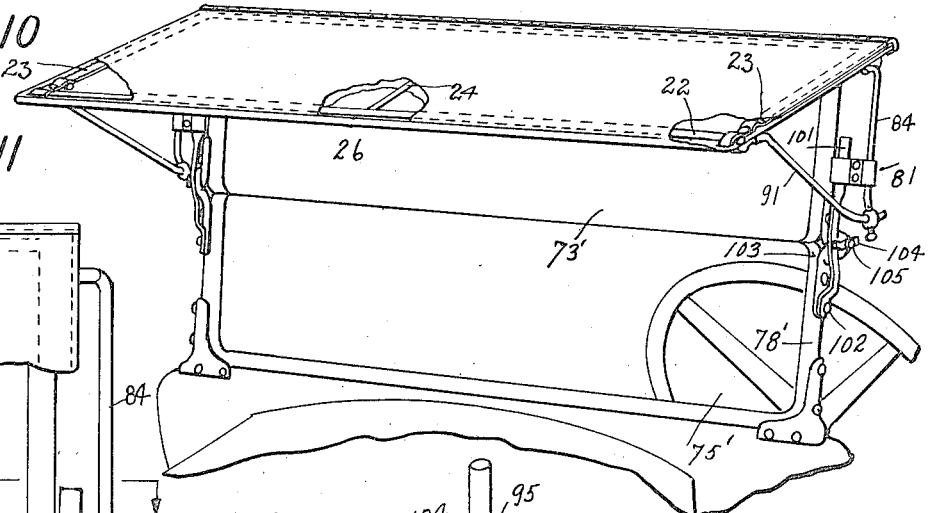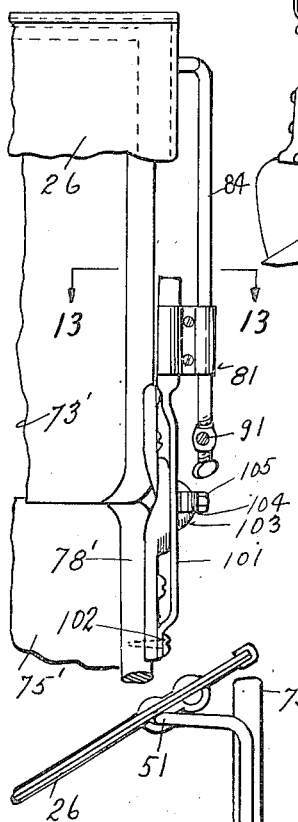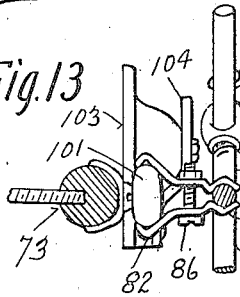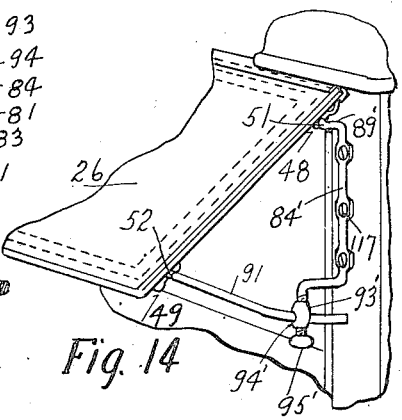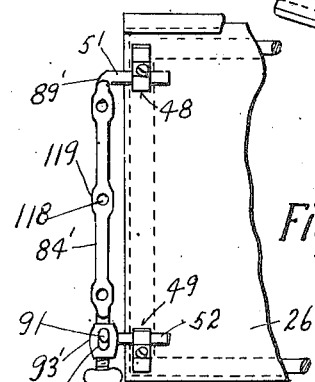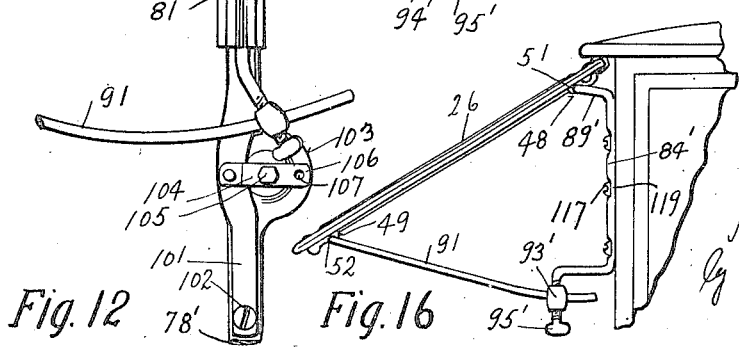

ARTHUR W. MUELLER, OF CINCINNATI, OHIO

CANOPY FOR AUTOMOBILES.

1,424,421. Specification of Letters Patent. Patented Aug. 1, 1922.

Application filed April 5, 1920. Serial No. 371,425.

*To all whom it may concern:*

Be it known that I, ARTHUR W. MUELLER, a citizen of the United States, residing at Cincinnati, in the county of Hamilton and State of Ohio, have invented certain new and useful Improvements in Canopies for Automobiles, of which the following is a specification.

It is the object of my invention to provide a canopy for automobiles which is arranged to be attached to an automobile as an accessory; further, to provide a canopy of novel construction and arrangement for an automobile, whereby convenience of adjustability is obtained; further, to provide an improved canopy for automobiles, comprising a framework over which a covering is arranged to be received, the framework being so constructed and arranged that adjustment thereof will avoid unsightly and annoying looseness, flapping or sagging of the covering; further, to provide novel means for supporting the canopy; further, to provide such means whereby the canopy is adapted for automobiles of different widths; and further, to provide novel means whereby close connection is obtained between the canopy and the automobile.

The invention will be further readily understood from the following description and claims, and from the drawings, in which latter:

Fig. 3 is a side elevation of the same, partly in section.

Fig. 4 is a detail in section taken on the line 4—4 of Fig. 5.

Fig. 5 is a cross-sectional detail of my improved canopy, taken in the plane of the line 5 of Fig. 4.

Fig. 6 is a detail of the clamping means, taken on the line 6—6 of Fig. 3.

Fig. 7 is an enlarged detail in side elevation, showing the flexing contact of the upper end of the canopy with the top of the automobile.

Fig. 8 is a plan view detail of my improved canopy, partly broken away.

Fig. 9 is an inside elevation of my improved device as applied to an automobile, the wind-shield posts of which have less distance between them than the distance between the wind-shield posts, shown in the automobile in Figs. 1 and 2, and showing my improved device adapted for such narrower automobile, parts being broken away for better illustration.

Fig. 10 is a perspective view of my improved device as applied to a Ford automobile of touring car style, parts being partly broken away for better illustration.

Fig. 11 is a front elevation of one end of the same, partly broken away.

Fig. 12 is a side elevation of the same.

Fig. 13 is a detail in plan section, taken on the line 13—13 of Fig. 11.

Fig. 14 represents a perspective view of one end of my improved canopy, showing it applied to a closed car automobile.

Fig. 15 is a rear elevation of one end of the same, and,

Fig. 16 is a side elevation of the same.

My improved device comprises a frame, which is preferably of metal, and is preferably adjustable, and a covering which is preferably of flexible material, such as leather, or any of the imitation leathers or leatherized or coated fabrics, now in use for automobile tops and seats, or other suitable material. The canopy is intended to be placed in front of the top portion of the usual wind-shield of the automobile, and is provided for the purpose of protecting the wind-shield and the driver or occupants of the automobile from rain, snow, hail, and the like, and to prevent lodgment thereof on the wind-shield, which tends to obstruct the vision of the driver. The invention is further provided for the purpose of shading the usual wind-shield, which is of glass, and protecting the same against the direct and reflected rays of the sun, street lamps, and headlights and lamps of oncoming vehicles.

Convenient means are provided for attaching the canopy to an automobile and adapting the same to automobiles of different widths and structures. Adjusting means are provided whereby the canopy may be inclined at desired angles, the manipulation of the adjusment being so placed preferably as to be within the usual rain or storm curtain of a touring car or roadster.

Figure 1:
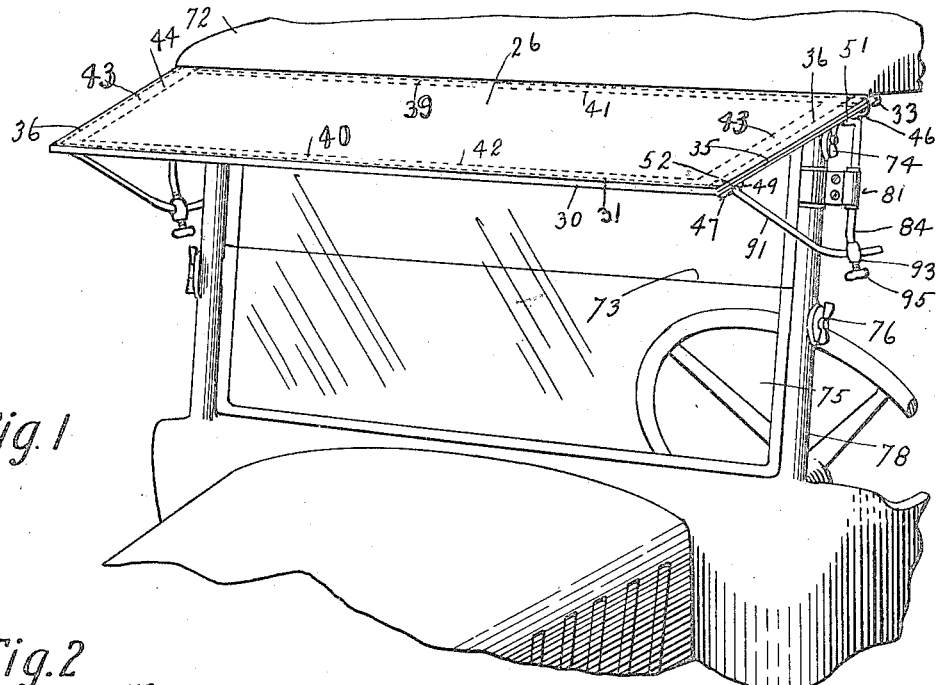
Fig. 1 represents a perspective view of my improved device as applied to an automobile of standard construction, for instance of touring car style, the automobile being partly broken away.
Figure 2:
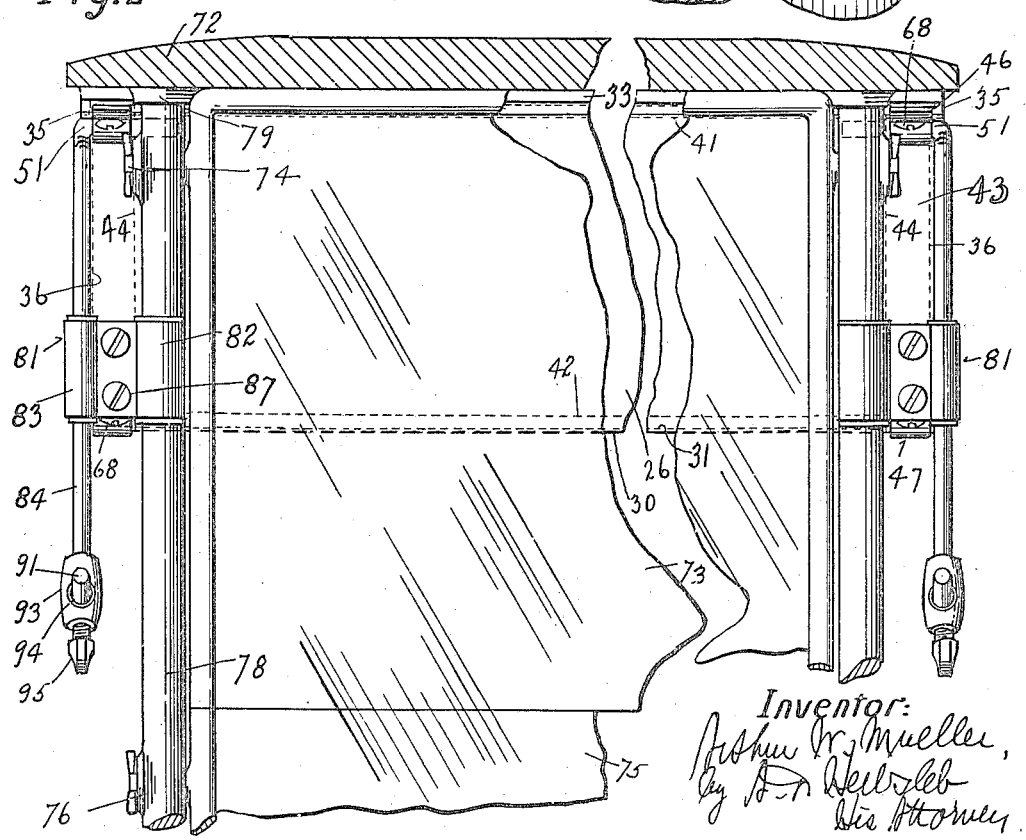
Fig. 2 is a rear elevation of the same, partly broken away.

I have in Figs. 1 to 9 inclusive shown my improved device applied to a standard automobile, in Figs. 10 to 13 inclusive, as applied to a Ford automobile; and in Figs. 14 to 16 as applied to a closed car.

The frame of the canopy exemplified comprises an upper rod 21 and a lower rod 22, between which end-bars 23, and preferably an intermediate bar 24 are located. The intermediate bar is preferably fixed in position with relation to the rods, as by having its ends received in sockets 25 in the rods. Suitable clamping means are preferably provided for clamping the end-bars to the rods in such manner as to permit adjustment between the bars and the rods in directions lengthwise of the rods for the purpose, as hereinafter more fully explained, of providing means for stretching the cover 26 of the canopy and rendering the same taut on the frame from time to time in order to prevent flapping of the cover, and looseness or sagging thereof.

The cover is preferably made of a single piece, having a front folded edge 30, adjacent to which there is a seam 31, extending lengthwise of the fold. This fold and seam are lengthwise of the median line of the piece of goods out of which the cover is formed, the piece of goods or blank being folded face side out. The mating opposite edges of the cover, which are parallel with the fold, are connected by a seam 32. A binding 33 covers the mating edges and extends lengthwise thereof, having its edges fixed to the upper margin of the cover by a row of stitching 34. This forms an upper flexible margin for the cover for the purpose hereinafter described. The lateral edges of the cover have their edges inturned as shown at 35, a seam 36 sewing the margin and inturned edges together.

The cover is further provided with seams to form channels in which the rods and end-bars are received. These rods and end-bars are preferably slipped into these channels before the rods and bars are built into frame form, through suitable slits or openings in the seams, the slits or openings being then closed by the finishing of the seams after the rods and bars have been received therethrough. Thus an upper channel 39 and a lower channel 40 are provided for the rods, by means respectively of the stitching 34 and stitching 41, for forming the upper channel, and the stitching 31 and stitching 42 for forming the lower channel. Channels 43, are formed for the end-bars. The channels 43 are formed by the seams 36 and stitching 44.

The rods 21, 22, are passed endwise into the channels 39, 40. The intermediate bar 24 is passed into the space between the upper and lower layers of the cover through suitable openings in the seams 32, 34, 42. Its ends are received in the sockets 25, to prevent release of said bar from said sockets when the curtain is stretched lengthwise, the bar being preferably inserted in the sockets prior to said lengthwise stretching in order to provide for their ready reception in the sockets. The canopy is provided with bearings 46, 47, for the respective rods 21, 22, and with pivot bearings 48, 49, respectively for pivots 51, 52.

The end bars 23 are provided with bearing grooves 54, 55, in which the rods 21, 22, are respectively received at each end of said rods. These bars are also provided with bearing grooves 56, 57, forming the upper parts of the bearings 48, 49. The end-bars are received endwise into the channels 43.

Clamps 61, 62, are provided at the respective ends of the canopy for clamping the end bars at desirable positions lengthwise of the rods. The clamp 61 is provided with bearing grooves 63, 64, respectively for the rod 21 and pivot 51, and the clamp 62 is provided with bearing grooves 65, 66, respectively for the rod 22 and the pivot 52. The end-bars and clamps are preferably of sufficient width to allow a considerably lateral movement of said bars along the rods, while retaining a sufficient portion of the ends of the rods in the grooves to securely clamp said ends in said grooves.

Screws 68 are received through holes 69 in the clamp plates and are received in threaded holes 70 in the respective end bars for clamping the clamp plates, the rods and the bars securely together, with the cover in stretched relation over the frame of the canopy. Final stretching of the cover and stretching of the same from time to time, may be obtained by tapping on the end bars to move them outwardly when the clamps are in substantially clamped relation. The ends of the screws are located between the bulged portions of the proximate bearing grooves at respectively the upper and the lower portions of the end-bars. It will be noted from Fig. 5 that the rod and the bar at respectively the upper and lower portions of the canopy are between the layers of the cover, the lower layer of the cover being between the respective rods and end-bars and the clamp-plates.

The flexible covering is so arranged that its outer or finished face is presented upwardly and forwardly and also rearwardly and downwardly, so as to present a finished appearance from all points of view.

The upper margin of the cover is flexible, but sufficiently resistant to flexure so as to make a firm joint between the canopy and the top 72 of the automobile, in order at all times to avoid the presence of annoying drafts above the head of the driver.

In Figs. 1, 2, 3 and 9, the usual upper section of the wind-shield of an automobile is shown at 73, pivoted on clamp pivots 74. The usual lower section of the wind-shield is exemplified at 75, pivoted on clamp pivots 76.

Posts 78 extend upwardly, rigidly from the body of the automobile, into the horizontal plane in which the upper section of the wind-shield is located, the sections of the wind-shield being pivoted to the posts. The top 72 of a touring car, when up, rests at its front end by means of stops 79 on the upper ends of the posts. The wind-shield is usually exposed to wind and weather, and snow and rain readily accumulates on it so that vision therethrough is obstructed. The glare of the sun and of street lights and of the headlights of oncoming vehicles also tends to blind the driver. I avoid these objections by means of my improved canopy, which is so positioned with relation to the wind-shield as to protect the same, and means are provided whereby the canopy may be readily attached to any automobile.

Exemplifying the attachment, I provide a clamp 81, shown as a two-part clamp, comprising jaws 82 arranged to be received about one of the posts of the wind-shield, and jaws 83 arranged to be received about an upright 84. Cushion-linings are provided for the jaws. Clamp-bolts 86, coacting with a nut 87, clamp the jaws about the post and upright. There is a clamp at each end of the wind-shield, preferably extending outwardly from the posts, with the inner ends of the clamp practically outside the inner line of the post to avoid interference with the adjustment of the wind-shield. The clamps are arranged to be selectively positioned up and down on the posts, and the uprights are arranged to be arranged in selective positions in the clamps, so as to adjust the pivot ends of the uprights to desired positions in order to pivot the canopy properly with relation to the particular top with which it is to coact. In the present instance in Figs. 1 to 9 inclusive, the upright is provided with the pivot 51, which extends laterally with relation to the upright, the upright being provided with a forward bend 89 at its upper end, on which the pivot is located.

A brace 91 has the pivot 52 thereon which has connection with the forward or lower end of the canopy, the rear portion of the brace being adjustably connected with the upright. This rear portion is preferably curved on an arc described from the pivot for the canopy on the upright. This adjustable connection may be accomplished by a clamp 93 at the lower end of the upright, the brace being received through an opening 94 in said clamp and fixed in adjusted positions by means of a clamp screw 95.

The parts are so arranged as to accommodate themselves to automobiles of various widths at their wind-shield portions. The pivots 51 of the uprights and the pivots 52 of the braces may be comparatively long and arranged so that they may at any portions of their lengths be received in the pivot-bearings therefor in the canopy. These pivots may be projected inwardly as exemplified in Figs. 1, 2 and 3, when fitting the canopy to an automobile having comparatively great width at the wind-shield portion, or the uprights and braces at the respective sides of the automobile may be interchanged, placing the upright and brace which would normally be at the right, to the left of the machine, and placing the upright and brace which would normally be at the left of the machine, to the right of the machine. This interchange causes the pivots of the uprights and braces to project laterally outwardly with relation to the wind-shield, as exemplified in Fig. 9, and accommodates the canopy to automobiles having comparatively less width at the wind-shield portion thereof.

I have in Figs. 10 to 13 inclusive exemplified my improved device as applied to an automobile, in which the post or standard extending from the body terminates at the upper end of the lower section 75' of the wind-shield, for instance as in a Ford automobile. For an automobile of this character I provide extensions for the respective posts 78' to which extensions the clamps 81 are arranged to be secured. Thus a supplemental post 101 is secured to the post 78' at each side of the automobile, and extends upwardly into the horizontal plane in which the upper section 73' of the wind-shield is located. This supplemental section of the post is shown secured in position by means of one of the screws 102 which secure the usual hinge 103 to the post 78' and a bracket 104 fixed to the supplemental post and received over the usual hinge-bolt 105 of the upper wind-shield section. The bracket is continued as shown at 106 and is provided with a hole 107 for receiving the usual hook of the usual connection for the top of the automobile, not shown because well known.

The canopy and its attaching means hereinbefore described, may be employed in connection with the wind-shield of touring cars, roadsters or the like, whether or not the top is up or down, as the support of the canopy is independent of the top. This is advantageous for the reason that the employment of the canopy is desirable to protect the view ahead and prevent glare in the eyes of the driver as well when riding with the top down as when riding with the top up.

I have in Figs. 14 to 16 inclusive, exemplified my invention as applied to a closed car. In this instance the upright 84' is secured directly to the front upright of the body of the automobile, as by means of screws 117 passing through holes 118 in flattened portions 119 of said uprights. The upright is provided with the forward band 89' from which the pivot 51 extends, the pivot being received in the pivot-bearing 48 of the canopy. The brace 91 has its laterally extending pivot 52 received in the pivot-bearing 49 of the canopy. The brace extends through an aperture 94' in a clamp 93' being secured in adjusted position in the clamp by means of a set-screw 95'.

My improved device is easily attached to the diversity of cars mentioned, and provides a pleasing appearance and effective protection to the wind-shield and driver.

Having thus fully described my invention, what I claim as new, and desire to secure by Letters Patent, is:

1. In a canopy for automobiles, the combination of an upper rod, a lower rod, a cross-bar at each end of said rods adjustable lengthwise of said rods for adjustably connecting said rods, each of said cross-bars provided with bearing-portions in which said rods are received, a cover provided with channels in which said rods and said cross-bars are located, and clamps outside said channels, said clamps provided with bearing-portions complemental to said first-named bearing-portions for clamping said cross-bars at selective points lengthwise of said rods to the ends of said rods.

2. In a canopy for automobiles, the combination of an upper rod and a lower rod, end cross-bars between the ends of said rods, an intermediate cross-bar between said rods, a flexible cover provided with channels in which said respective upper and lower rods and said cross-bars are located, a supporting pivot for each end of said canopy, a brace-pivot for each end of said canopy, each of said end-cross-bars formed with bearing-parts for said rods and said pivots, and clamps provided with bearing-parts complemental to said first-named bearing-parts and coacting therewith for clamping said rods, said end-cross-bars and said pivots together.

3. In a device of the character described, the combination of a canopy comprising end-bars, said end-bars provided with bearings open at both ends toward the outer edges and the inner edges respectively of said respective end-bars, laterally extending pivots for the upper portions of said end-bars, said pivots being interchangeable for extending in opposite directions into said bearings respectively from the outer edges and the inner edges of said respective end bars, and adjustable braces for the lower portions of said canopy.

4. The combination with the wind-shield posts of an automobile, of a clamp arranged to be clamped to each of said posts, a canopy, a pair of uprights, each of said clamps comprising a clamp in which one of said uprights is lengthwise adjustable, the upper end of each of said uprights provided with a forwardly extending bracket and a laterally extending pivot for said canopy on the forward end of said bracket, said pivots extending in opposite directions, a pair of braces provided with laterally oppositely extending pivots at their forward ends and having connections with said canopy, said pair of uprights and said pair of braces respectively interchangeable one with the other for positioning said pivots in reversely oppositely extending directions, and a clamp at the lower end of each of said uprights for said respective braces.

In testimony whereof, I have hereunto signed my name in the presence of two subscribing witnesses.

ARTHUR W. MUELLER.

In presence of—
GEORGE S. HAWKE,
DELMA WERNSING.